United States Patent
Nagler

(10) Patent No.: US 10,242,519 B2
(45) Date of Patent: Mar. 26, 2019

(54) METHOD FOR CONTROLLING AT LEAST ONE VEHICLE FUNCTION OF A VEHICLE ASSEMBLY, AND VEHICLE ASSEMBLY

(71) Applicant: Brose Fahrzeugteile GmbH & Co. Kommanditgesellschaft, Bamberg, Bamberg (DE)

(72) Inventor: Toni Nagler, Bamberg (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 15/793,314

(22) Filed: Oct. 25, 2017

(65) Prior Publication Data
US 2018/0114388 A1   Apr. 26, 2018

(30) Foreign Application Priority Data
Oct. 25, 2016  (DE) .................. 10 2016 012 708

(51) Int. Cl.
| | |
|---|---|
| *G07C 9/00* | (2006.01) |
| *B60R 9/042* | (2006.01) |
| *B60R 25/24* | (2013.01) |
| *B60R 25/20* | (2013.01) |
| *B60J 5/10* | (2006.01) |
| *B60R 9/055* | (2006.01) |

(52) U.S. Cl.
CPC ............ *G07C 9/00309* (2013.01); *B60J 5/10* (2013.01); *B60R 9/042* (2013.01); *B60R 25/2054* (2013.01); *B60R 25/24* (2013.01); *B60R 9/055* (2013.01); *B60R 2325/103* (2013.01); *E05Y 2800/74* (2013.01); *E05Y 2900/546* (2013.01)

(58) Field of Classification Search
CPC . G07C 9/00309; B60L 11/1864; B60R 16/02; B60R 16/033; B60R 2325/103; B60R 25/24; B60R 9/042; H02J 2007/0067; H02J 7/0063; E05Y 2800/74; E05Y 2900/546
USPC ........................................................ 340/5.72
See application file for complete search history.

(56) References Cited

U.S. PATENT DOCUMENTS

| | | | |
|---|---|---|---|
| 6,827,244 B1 * | 12/2004 | Stapleton | ................ B60R 9/042 224/310 |
| 7,000,982 B2 | 2/2006 | Kreiner et al. | |
| 8,493,236 B2 | 7/2013 | Boehme et al. | |
| 2010/0114437 A1 | 5/2010 | Boss et al. | |

(Continued)

FOREIGN PATENT DOCUMENTS

| | | |
|---|---|---|
| DE | 103 16 594 A1 | 10/2004 |
| DE | 10 2004 031 224 A1 | 1/2006 |

(Continued)

*Primary Examiner* — Hirdepal Singh
(74) *Attorney, Agent, or Firm* — Muncy, Geissler, Olds & Lowe, P.C.

(57) ABSTRACT

A method for controlling at least one vehicle function of a vehicle assembly having a vehicle and a roof rack which is mounted on a roof of the vehicle, wherein a communication link is produced between the roof rack and the vehicle, wherein at least one piece of information comprising the mounting state of the roof rack is transmitted to the vehicle via the communication link, and wherein the piece of information is taken into account in the control of the at least one vehicle function.

16 Claims, 5 Drawing Sheets

(56) References Cited

U.S. PATENT DOCUMENTS

| | | | |
|---|---|---|---|
| 2011/0315726 A1* | 12/2011 | Huhn | B60R 9/058 |
| | | | 224/329 |
| 2013/0234828 A1* | 9/2013 | Holzberg | B60R 25/2054 |
| | | | 340/5.72 |
| 2014/0005887 A1* | 1/2014 | Tippelhofer | 701/37 |
| 2015/0345205 A1* | 12/2015 | Gunreben | E05F 15/77 |
| | | | 701/2 |
| 2016/0114733 A1* | 4/2016 | Pfaeffli | B60R 9/045 |
| | | | 224/318 |
| 2016/0171892 A1* | 6/2016 | Gieseke | G08G 1/04 |
| | | | 348/148 |
| 2017/0129383 A1* | 5/2017 | Bika | B60P 7/0861 |
| 2017/0334344 A1* | 11/2017 | Salter | B60Q 1/2661 |
| 2018/0039283 A1* | 2/2018 | Srivastava | G05D 1/0276 |

FOREIGN PATENT DOCUMENTS

| | | |
|---|---|---|
| DE | 10 2009 021 282 A1 | 11/2010 |
| DE | 10 2013 001 118 A1 | 7/2014 |
| DE | 10 2016 113 981 A1 | 2/2017 |

* cited by examiner

METHOD FOR CONTROLLING AT LEAST ONE VEHICLE FUNCTION OF A VEHICLE ASSEMBLY, AND VEHICLE ASSEMBLY

This nonprovisional application claims priority under 35 U.S.C. § 119(a) to German Patent Application No. 10 2016 012 708.8, which was filed in Germany on Oct. 25, 2016, and which is herein incorporated by reference.

BACKGROUND OF THE INVENTION

Field of the Invention

The invention relates to a method for controlling at least one vehicle function of a vehicle assembly and a vehicle assembly.

Description of the Background Art

Vehicles, in particular motor vehicles, are used for travel and currently represent an apparently indispensable means of transporting people from one place to another. In addition to transporting passengers, vehicles are used to transport luggage. For this purpose, vehicles have a certain storage space, for example a trunk or the like. This storage space, however, is limited. Under certain conditions, vehicles have insufficient storage space for luggage transport. Examples include the transport of skis, snowboards or similar in the context of a winter holiday, or the transport of one or more bicycles.

From the prior art, it is known to increase the storage space of the vehicle by attaching luggage racks to the roof of the vehicle (hereinafter referred to as roof racks). Such a roof rack may, for example, be a so-called roof box or a bike rack. In the following, a vehicle with a roof rack mounted on the roof of the vehicle is known as a vehicle assembly. By attaching the rack, the vehicle assembly has a changed configuration as compared to the vehicle (without the roof rack). Compared to the vehicle, the vehicle assembly, for example, may exhibit a different air resistance and have altered dimensions, in particular a different height. Furthermore, the total mass of the vehicle can considerably increase due to the mounted and loaded roof rack. The changed configuration can result in reduced safety and/or an impairment of the vehicle function. For example, a braking function of the vehicle can be influenced by the increased total mass. Furthermore, the roof rack as a disturbing component can increase the danger of collision.

SUMMARY OF THE INVENTION

It is therefore an object of the invention to eliminate the disadvantages according to the prior art. In particular, a method for controlling at least one vehicle function of a vehicle assembly and a corresponding vehicle assembly are provided, which improve operational safety.

According to an exemplary embodiment of the invention, a method is provided for controlling at least one vehicle function of a vehicle assembly comprising a vehicle and a roof rack mounted on a roof of the vehicle. The inventive method is characterized in that a communication link is produced between the roof rack and the vehicle, that via the communication link at least one piece of information comprising a mounting state of the roof rack is transmitted to the vehicle, and that the piece of information is considered when controlling the at least one vehicle function.

By taking into account the piece of information containing the mounting state of the roof rack, advantageously, the control of the vehicle function can be adapted to the actual configuration of the motor vehicle assembly. In particular, the presence of the roof rack, the changed air resistance, the changed total mass and/or the changed dimensions of the vehicle assembly can be considered in order to ultimately increase operational safety. According to an embodiment of the invention, the increase in operational safety can be achieved in that the vehicle function is deactivated, disabled or restricted (as will be explained in detail below). The restriction of the vehicle function ensures that at least the main features of the corresponding vehicle function are available to the vehicle user. This improves user comfort as compared to a complete deactivation or disabling of the vehicle function.

The roof rack may be, for example, a roof box or a roof rack.

According to an embodiment of the invention, the communication link is a wireless communication link, in particular a near field communication. In this case, it is advantageously possible to dispense with the expense of installing lines. However, alternatively, it is also conceivable for the communication link to be produced in a cabled manner.

According to an embodiment of the invention, the communication link is produced directly between the roof rack and the vehicle. In this embodiment, it can be provided, in particular, that the communication link is produced without the assistance of a user and thus is produced particularly comfortably. Alternatively, it can be provided that the communication link is produced indirectly with the interposition of a mobile device, in particular a mobile telephone. This makes it possible to transmit the piece of information even if the roof rack and the vehicle are not inherently (directly) compatible for producing the communication link with one another.

According to an embodiment of the invention, for establishing the communication link, the roof rack comprises a transmitting device and the vehicle a receiving device. The transmitting device can, for example, be an NFC chip (near field communication chip). It is also conceivable that the transmitting device and the receiving device are configured to produce a Bluetooth connection.

According to an embodiment of the invention, the piece of information indicates that the roof rack is mounted. Via the communication link, the vehicle is, in other words according to this embodiment, merely informed that the roof rack is located on the roof. The piece of information can then be taken into account by the vehicle when controlling the vehicle function.

According to a further embodiment of the invention, the piece of information indicates the type of roof rack and/or a mounting position of the roof rack. This embodiment allows for a more precise consideration in the control of the vehicle function, for example to the effect of taking into account the dimensions and/or the mass, differentiated depending on the type of the roof rack. The piece of information may for example comprise only an identification of the type, wherein on board, more accurate data, in particular mass, dimensions or the like can be accessed via a mobile connection or similar, or can be read from an onboard memory. The mounting position of the roof rack, for example, can be coded via an attachment device, by means of which the roof rack is attached to the roof of the vehicle, in particular via mounting points used for attaching. In turn, the knowledge of the mounting position allows for differentiated consideration in the control of the vehicle position. For example, it is conceivable that by taking into account the mounting position in a first mounting position, a vehicle function continues to be available, that it only remains available in a limited capacity in a second mounting position, and that it is deactivated or disabled in a third mounting position, so no longer available at all.

According to an embodiment of the invention, the vehicle function relates to the control of a motor-adjustable hatch of the vehicle and/or a navigation function of the vehicle. The hatch can be, for example, a hatchback, a hardtop, a sliding roof or a sliding lifting roof.

It is also conceivable within the scope of the invention that the vehicle function relates to a braking operation of the vehicle, such as an antilock braking system (ABS), or a driver assistance system, for example as part of a vehicle dynamics controller using an electronic stability control.

According to an embodiment of the invention, production of the communication link and/or the transmission of the piece of information is triggered by a trigger event. This way, power consumption can be advantageously reduced since the piece of information is only transmitted, or the communication link, in particular the wireless communication link, is only produced when necessary.

In further accordance with the invention, a vehicle assembly for controlling at least one vehicle function is provided. The vehicle assembly includes a roof rack mounted on a roof of a vehicle, a roof rack comprising a transmitting device, and an onboard receiving device, wherein the transmitting device and the onboard receiving device are designed for producing a communication link and for transmitting a piece of information comprising at least one mounting state of the roof rack, and wherein a device for considering the piece of information in the control of the at least one vehicle function are provided.

According to an embodiment of the invention, the device for consideration include at least one control unit associated with the vehicle function. The control unit can be, for example, a hatchback control unit, a navigation control unit or a central control unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
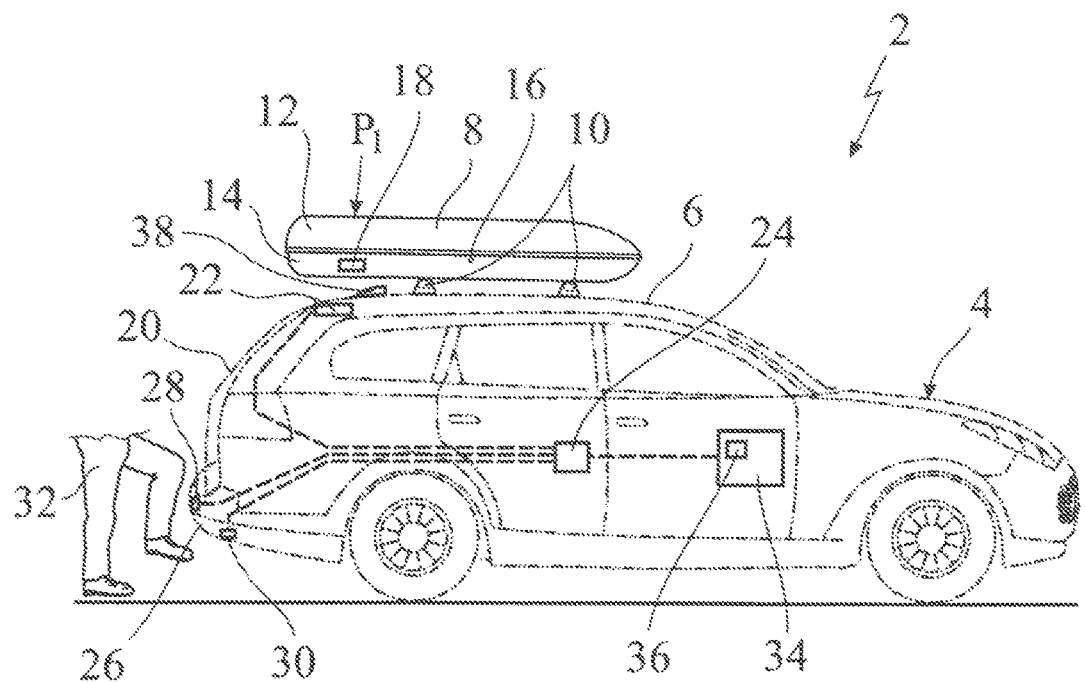
FIG. 1 is a side view of a vehicle assembly according to the invention according to an embodiment, wherein a hatchback of the vehicle is in a closed position.

FIG. 1 shows a side view of a vehicle assembly 2 according to the invention according to a first embodiment. The vehicle assembly 2 comprises a vehicle 4 and a roof rack 8 which is mounted on a roof 6 of the vehicle 4 in a first mounting position P1. The roof rack 8 is mounted on the roof 6 by means of a support structure comprising two crossbeams 10. It is also conceivable for the support structure, alternatively or additionally, to include two longitudinal beams (so-called roof rails) which extend in the vehicle longitudinal direction and are arranged on the roof 6.

The roof rack 8 is designed as a roof box in FIG. 1. An alternative roof rack 8 can be designed as a bicycle carrier.

The roof rack 8 comprises a hollow body which is formed from a top part 12 and a bottom part 14 and defines a storage space. The roof rack 8 can be brought from the closed position shown in FIG. 1 into an open position in which a loading and unloading is possible by, for example, folding over the upper part 12 in relation to the lower part 14. The roof rack 8 has a locking arrangement 16 with which the roof rack 8, in particular by means of a key, can optionally be brought into an unlocked or a locked position. The roof rack 8 further comprises a transmitting device 18, the function of which will be discussed in more detail below.

The vehicle 4 has a hatchback 20 in the rear region. The hatchback 20 is pivotally mounted on the vehicle body between a closed position shown in FIG. 1 and an open position (see FIG. 2). In an adjusting operation, the hatchback 20 can in this case be moved by a motor from the closed position to the open position and/or vice versa by means of a drive assembly 22, which comprises for example a spindle drive, and an associated hatchback control unit 24.

The adjusting operation of the hatchback 20 can be triggered by means of an operation occurrence. The operation occurrence may be, for example, actuating a mechanical operating element which is mounted on the hatchback 20, pressing a switch on a remote control or in the interior of the vehicle 4. The operation occurrence may, for example, also be triggered via a mobile device 40 (see FIG. 5), for example a mobile phone. The operation occurrence can also be triggered without contact. For this purpose, the vehicle 4 has a sensor assembly in the bumper 26 comprising a first proximity sensor 28 and a second proximity sensor 30. The proximity sensors 28, 30 are capacitive proximity sensors. The first proximity sensor 28 and the second proximity sensor 30 are electrically connected to the hatchback control unit 24, which serves in particular for activating and evaluating the sensor assembly. A non-contact operation occurrence by a user 32, for example a predefined operating gesture, can be detected by means of the sensor assembly. The operating gesture can, for example, be defined as a kick motion of a leg of the user 32, indicated by arrows in FIG. 1. As long as the kick motion, i.e., a valid operation occurrence, is considered recognized, the motorized opening or closing of the hatchback 20 is triggered.

The hatchback control unit 24 is connected via a communication link, for example a BUS connection, to a central control unit 34 of the vehicle 4. The central control unit 34 includes, among other things, a navigation control unit 36 for implementing a navigation function, as well as further control units for implementing various vehicle functions. Of course, the navigation control unit 36 and the further control units can be provided as separate modules, spatially separated from the central control unit 36.

Figure 2:
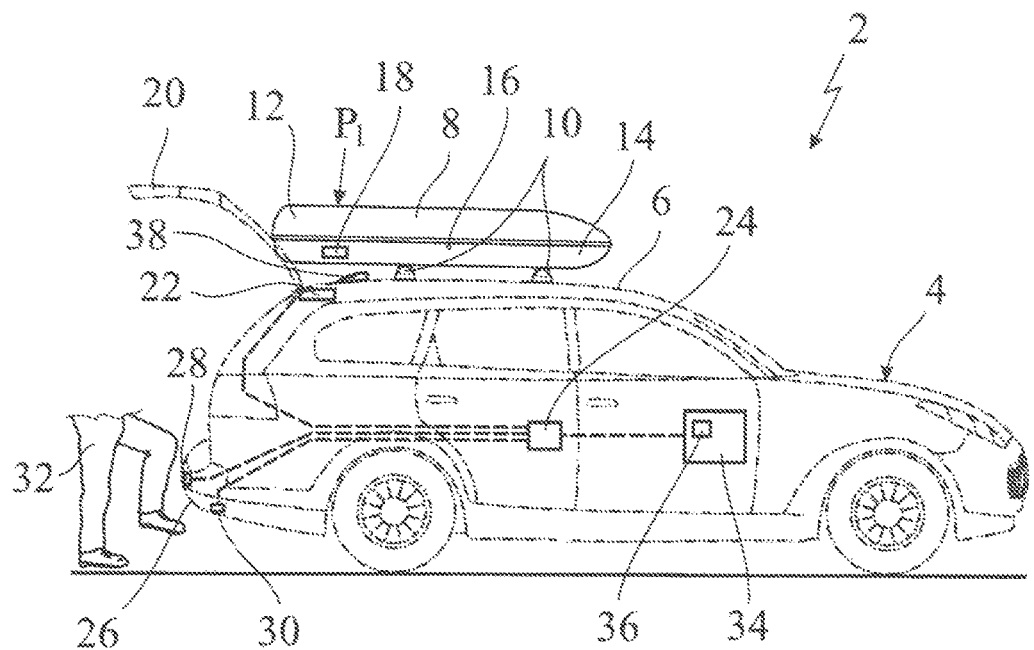
FIG. 2 is a side view of the vehicle assembly of FIG. 1, wherein the hatchback is in an open position.

FIG. 2 shows a side view of the vehicle assembly 2 of FIG. 1, wherein the hatchback 20 is in an open position. It can be clearly seen that the roof rack 8 mounted in the first mounting position P1 may collide with the hatchback 20 during the adjusting operation of the hatchback 20 into the open position, due to the configuration of the vehicle assembly 2 which is changed due to the roof rack 8. This collision may cause damage to the roof rack 8 and/or the hatchback 20. The present invention provides a remedy.

According to the invention, in particular it is provided that when the roof rack 8 is mounted, a communication link is produced between the transmitting device 18 in the form of an NFC chip and an appropriate receiving device 38 of the vehicle 4. The receiving device 38 may for example be integrated into an antenna assembly provided for radio reception. A separate receiving device 38 is likewise conceivable. Via the communication link, a piece of information is transmitted from the roof rack 8 to the vehicle 4. The piece of information at least includes the mounting state of the roof rack carrier 8. The piece of information is then transmitted to the central control unit 34 in the vehicle via a further communication link, in particular a BUS connection, and from there, is distributed to other control units, for example, the hatchback control unit 24 and the navigation control unit 36.

The hatchback control unit 24 considers the piece of information during activation of the hatchback 20. The consideration of the piece of information may be simple, such that the motorized opening of the hatchback 20, at least for one or more of the operation occurrences, preferably the pressing of a switch on a remote control or in the interior of the vehicle 4 as well as the contactless operation occurrence, is deactivated. The hatchback can then, for example, be opened only by means of the mechanical operating element attached to the hatchback 20.

Figure 3:
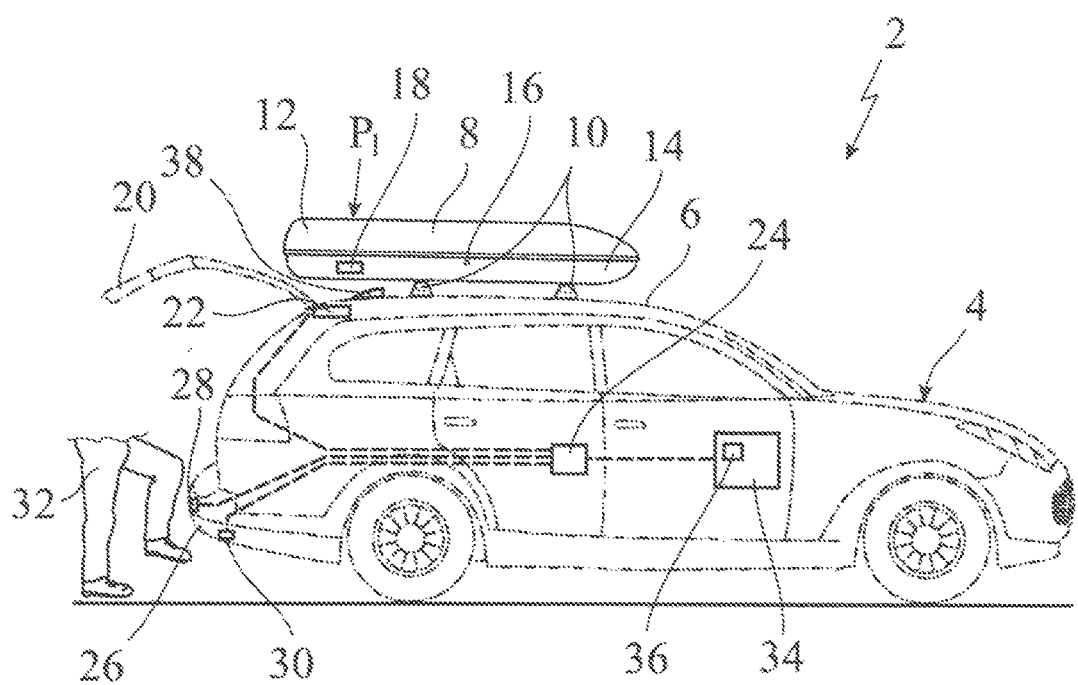
FIG. 3 is a side view of the vehicle assembly of FIG. 1, wherein the hatchback is in an intermediate position.

In an embodiment, the motorized opening of the hatchback 20 is merely restricted when the roof rack 8 is mounted, namely to the effect that the hatchback 20 may no longer be completely moved into the open position associated with danger of collision, but only into an intermediate position. This is shown in FIG. 3. The intermediate position is selected in such a way that, on the one hand, a collision between the hatchback 20 and the roof rack 8 is avoided, but on the other hand, the hatchback 20 can be opened sufficiently wide to ensure comfortable loading and unloading.

In an embodiment, the piece of information comprising the mounting state of the roof rack 8 additionally indicates the type of roof rack 8. Based on the type of roof rack 8, it can then be determined on board whether there is any risk of collision in the open position at all and, if necessary, a suitable collision-avoiding intermediate position can be selected. In other words, in this embodiment, the intermediate position is not fixed but is selected depending on the type of roof rack.

Figure 4:
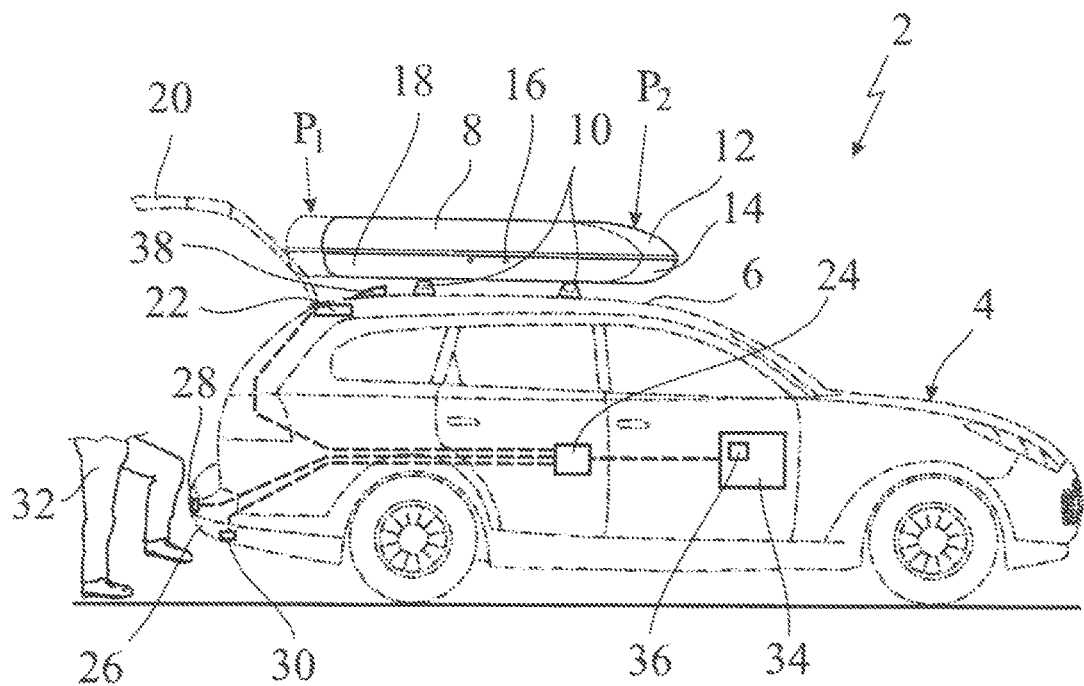
FIG. 4 is a side view of the vehicle assembly of FIG. 1, wherein a roof rack is in a mounting position that is changed as compared to FIG. 1.

In an embodiment, the piece of information comprising the mounting state of the roof rack 8 additionally indicates a mounting position of the roof rack 8 on the roof 6 of the vehicle 4. The mounting position may be coded, for example, via attachment points at which the roof rack 8 is attached to the crossbeam 10. This embodiment takes account of the fact that the roof rack 8 can be mounted in several positions on the roof 6 of the vehicle 4. In this case, a risk of collision between the hatchback 20 and the roof rack 8 may exist in the first mounting position P1 (FIGS. 1 to 3), while in a second mounting position P2 shown in FIG. 4, there is no danger of collision of the hatchback 20 in the open position and the roof rack 8. For purposes of comparison, FIG. 4 shows the first mounting position P1 as a dashed line. If the piece of information comprising the mounting state includes the mounting position P1 or P2, a differentiated consideration of the control of the relevant vehicle function, in this case the activation of the hatchback 20, can take place as a function of the mounting position P1 or P2. Whereas in the mounting position P1, the opening of the hatchback 20 is limited to the intermediate position, in the mounting position P2, the hatchback 20 can be brought into the open position without restriction.

In the navigation function of the vehicle 4, the navigation control unit 36 considers the piece of information about the mounting state of the roof rack 8. The configuration of the vehicle assembly 2 modified by the mounted roof rack 8 is, for example, accompanied by a change in overall height of the vehicle assembly 2. This modified, namely larger, overall height of the vehicle assembly 2 can, for example, make it impossible to pass through archways, underpasses and the like, since otherwise collision and damage would occur. The navigation control unit 36 takes this circumstance into account such that with a mounted roof rack 8, the proposed route will not include passages with danger of collision, but instead these are bypassed by way of an alternative route. The alternative route induced by the roof rack 8 that is selected and thus recommended to a vehicle driver can be shown on a display in the interior for purposes of informing the vehicle occupants.

Figure 5:
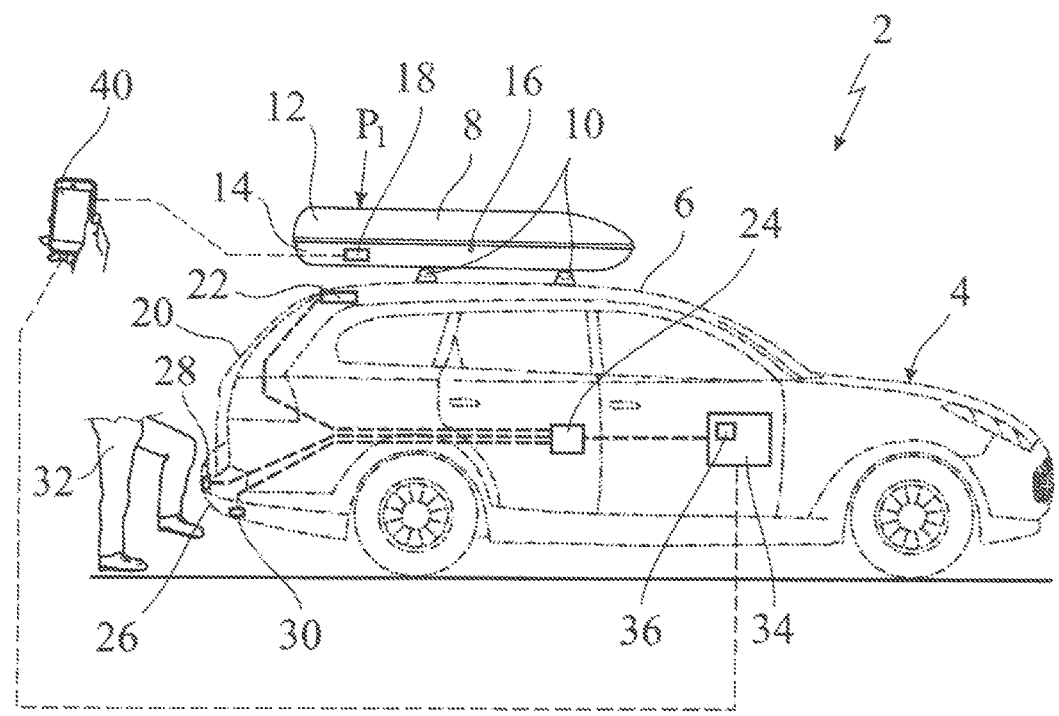
FIG. 5 is a side view of a vehicle assembly according to the invention according to a second embodiment, wherein the hatchback is in the closed position.

FIG. 5 shows a side view of a vehicle assembly according to the invention according to a second exemplary embodiment, wherein the hatchback is in the closed position. In this second embodiment, the communication link is not (as in the first embodiment) directly produced between the transmitting device 18 and the onboard receiving device 38. According to the second embodiment, it is provided that the communication link is produced with the interposition of a mobile device 40, namely a mobile telephone as in FIG. 5. This is useful particularly when the vehicle does not have a suitable receiving device which is directly compatible with the transmitting device 18 of the roof rack 8. This embodiment is in particular based on the idea that modern mobile devices 40 are configured in any case on the one hand for producing a short range radio link, a Bluetooth connection or the like, and on the other hand, also for coupling with the vehicle 4 over such a connection, for example as part of a hands-free device, or for transmitting audio signals to an entertainment system. The second embodiment of the invention makes use of these already existing conditions in that the piece of information comprises at least the mounting state that is first transmitted to the mobile device 40 and then to the vehicle 4, for example to the central control unit 34, for further distribution, in particular to the hatchback control unit 24 and/or the navigation control unit 34, and is taken into account in the control of the at least one vehicle function. As an alternative to a smartphone, the mobile device 40 may alternatively be a wearable, such as a smartwatch.

Production of the communication link for the transmission of the piece of information comprising at least the mounting state of the roof rack 8 is triggered by a trigger event. The trigger event can, for example, include the fact that the receiving device 38, which in this case is designed as a send/receive unit, cyclically transmits an interrogation signal. The interrogation signal can then, in turn, trigger the transmission of the piece of information comprising the mounting state of the roof rack 8 by means of the transmitting device 18, which is embodied, for example, as a passive transponder. Alternatively, the trigger event may be a start of a drive motor of the vehicle 4. The trigger event can also be triggered manually by a user, in particular via an onboard computer, or possibly by means of the mobile device.

In a further embodiment, the piece of information comprising the mounting state of the roof rack 8 additionally includes the state of the locking assembly 16, in particular whether the locking assembly 16 is presently in the unlocked or the locked state. The state of the locking assembly 16 can, as well as the type of roof rack 8 and/or the mounting position P1, P2, be displayed for the user, for example, on a display in the vehicle interior and/or on the mobile device 40.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling at least one vehicle function of a vehicle assembly comprising a vehicle and a roof rack that is mounted on the roof of the vehicle, the method comprising:
   providing a communication link between the roof rack and the vehicle;
   transmitting, via the communication link, at least one piece of information comprising a mounting state of the roof rack to the vehicle; and
   controlling, based on the piece of information, at least one vehicle function,
   wherein the piece of information indicates that the roof rack is mounted,
   wherein the roof rack is mountable on the roof of the vehicle in at least a first mounting position and a second mounting position,
   wherein the piece of information further indicates whether the roof rack is in the first mounting position or the second mounting position,
   wherein the controlling of the at least one vehicle function includes control of a degree of opening of a motor-adjustable hatch of the vehicle, and
   wherein the control of the degree of opening of the motor-adjustable hatch at the first mounting position of the roof rack is different from the control of the degree of opening of the motor-adjustable hatch at the second mounting position of the roof rack.

2. The method according to claim 1, wherein the communication link is a wireless communication link or a near field communication.

3. The method according to claim 1, wherein the communication link between the roof rack and the vehicle is provided directly or indirectly with the interposition of a mobile device or a mobile phone.

4. The method according to claim 1, wherein, for providing the communication link, the roof rack comprises a transmitting device and the vehicle comprises a receiving device.

5. The method according to claim 1, wherein the piece of information further indicates a type of the roof rack.

6. The method according to claim 1, wherein the consideration of the piece of information leads to the vehicle function being deactivated or restricted.

7. The method according to claim 1, wherein the vehicle function further relates to a navigation function of the vehicle.

8. The method according to claim 1, wherein the providing of the communication link and/or the transmission of the piece of information is triggered by a trigger event.

9. The method according to claim 1, wherein the roof rack is mountable on the roof of the vehicle in at least the first mounting position, the second mounting position and a third mounting position, wherein the piece of information further indicates whether the roof rack is in the third mounting position.

10. The method according to claim 9, wherein at the first mounting position of the roof rack, the motor-adjustable hatch is controlled to open to a fully-opened state, wherein at the second mounting position, the motor-adjustable hatch is controlled to open to an intermediate open state and at the third mounting position, opening of the motor-adjustable hatch is disabled.

11. A vehicle assembly for controlling at least one vehicle function and for implementing a method according to claim 1, the vehicle assembly comprising:
   a roof rack mounted on a roof of a vehicle; and
   a transmitting device;
   an onboard receiving device,
   wherein the transmitting device and the onboard receiving device are configured to produce a communication link and to transmit at least one piece of information including a mounting state of the roof rack,
   wherein the piece of information is taken into account in the control of the at least one vehicle function,
   wherein the piece of information indicates that the roof rack is mounted,
   wherein the roof rack is mountable on the roof of the vehicle in at least a first mounting position and a second mounting position,
   wherein the piece of information further indicates whether the roof rack is in the first mounting position or the second mounting position,
   wherein the control of the at least one vehicle function includes control of a degree of opening of a motor-adjustable hatch of the vehicle, and
   wherein the control of the degree of opening of the motor-adjustable hatch at the first mounting position of the roof rack is different from the control of the degree of opening of the motor-adjustable hatch at the second mounting position of the roof rack.

12. The vehicle assembly according to claim 11, wherein the transmitting device has an NFC chip.

13. The vehicle assembly according to claim 11, wherein at least one control unit is associated with the vehicle function.

14. The vehicle assembly according to claim 11, wherein the vehicle function further relates to the control of a navigation function of the vehicle.

15. A method for controlling at least one vehicle function of a vehicle assembly comprising a vehicle and a roof rack that is mounted on the roof of the vehicle, the method comprising:
   providing a communication link between the roof rack and the vehicle;
   transmitting, via the communication link, at least one piece of information comprising a mounting state of the roof rack to the vehicle; and
   controlling, based on the piece of information, at least one vehicle function,
   wherein the piece of information indicates a type of the roof rack, wherein the controlling of the at least one vehicle function includes control of a degree of opening of a motor-adjustable hatch of the vehicle, and wherein the control of the degree of opening of the motor-adjustable hatch is different depending upon the type of the roof rack.

16. The method according to claim 15, wherein, for a first type of roof rack, the motor-adjustable hatch is controlled to fully open, and for a second type of roof rack, opening of the motor-adjustable hatch is deactivated or the motor-adjustable hatch is controlled to partially open.

* * * * *